Sept. 4, 1951     O. HALMER     2,567,068
CAMERA MOUNTING OR DOLLY
Filed Dec. 7, 1945     2 Sheets-Sheet 1
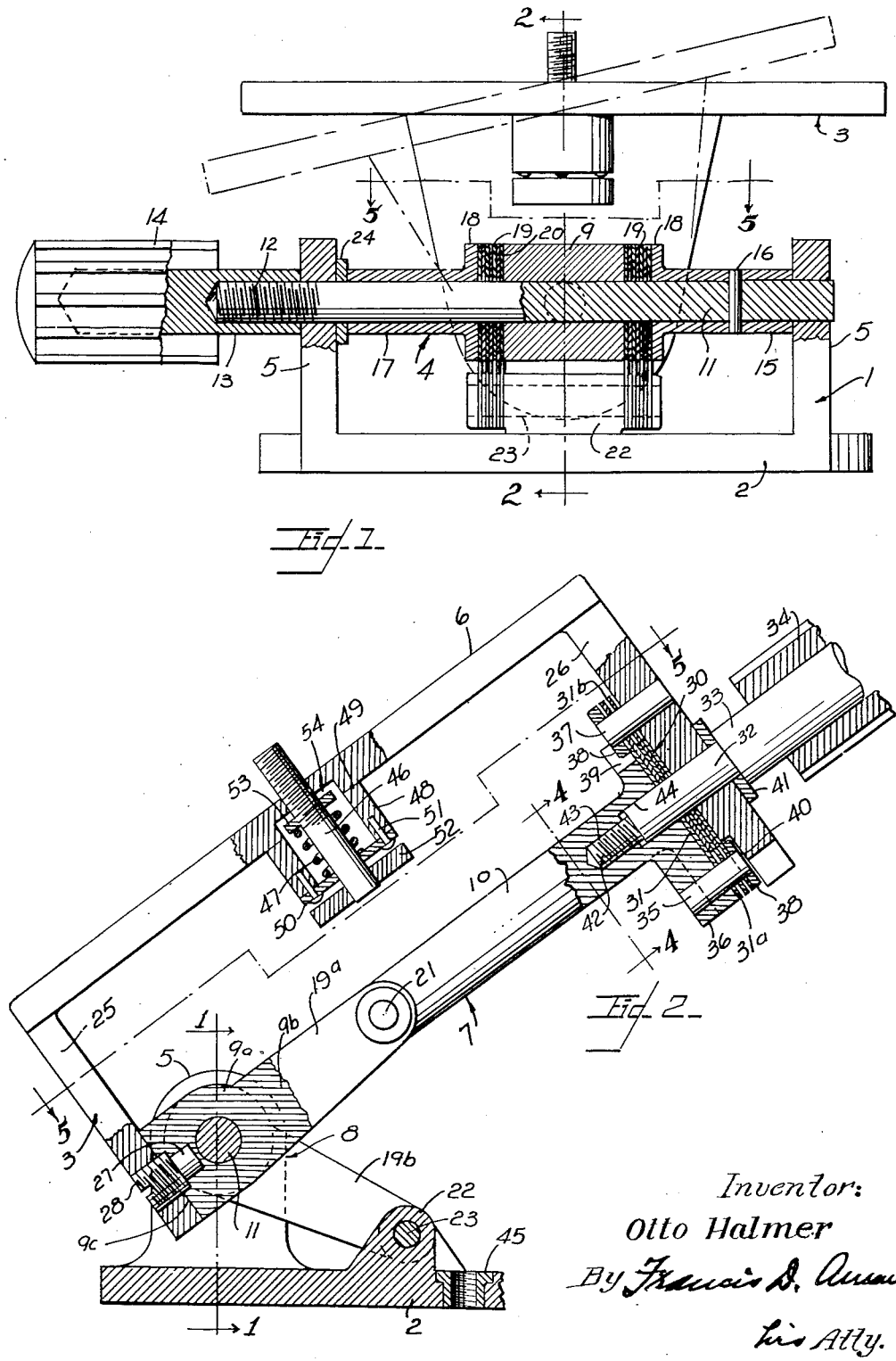
Inventor:
Otto Halmer

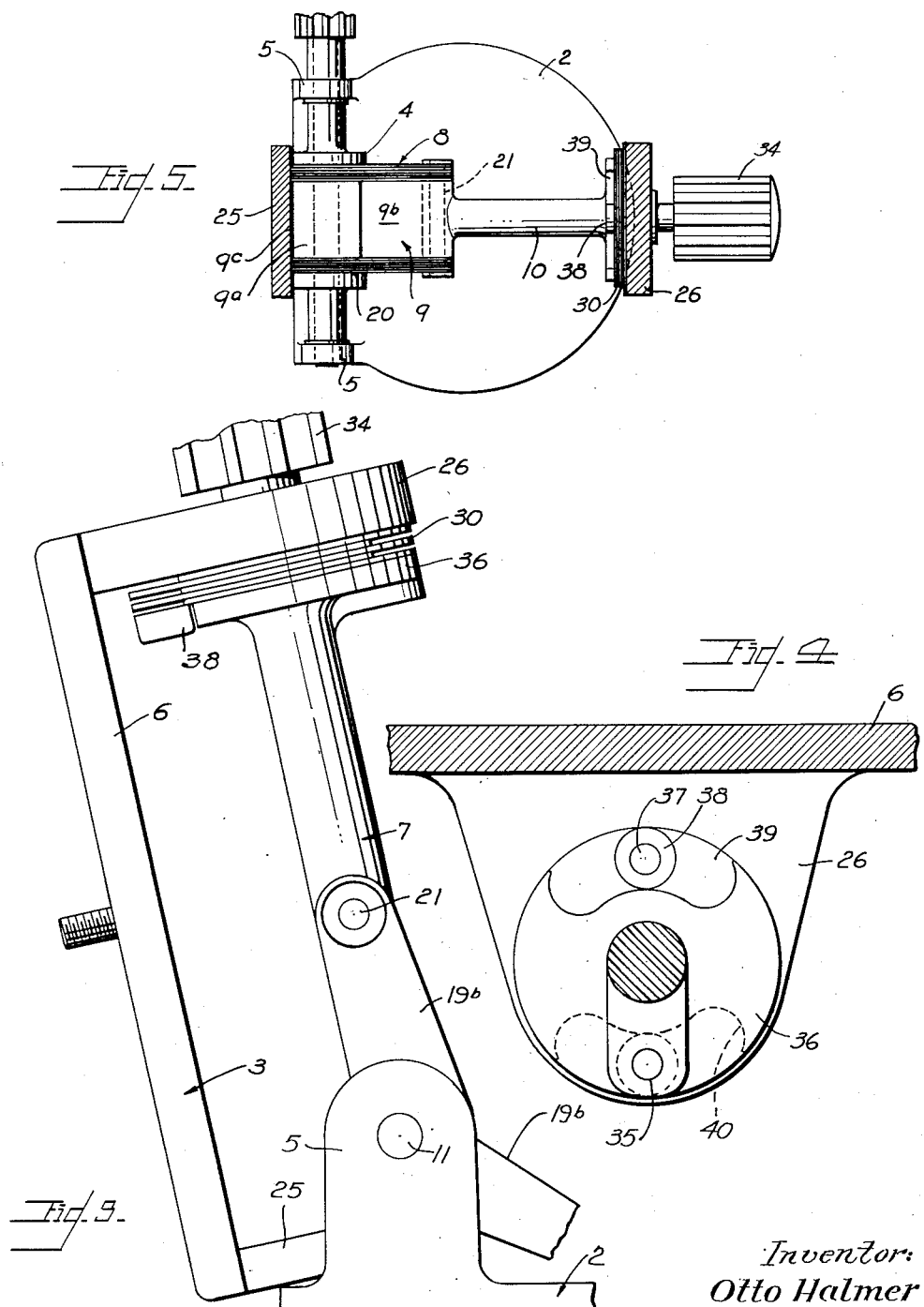

Patented Sept. 4, 1951

2,567,068

UNITED STATES PATENT OFFICE 2,567,068

CAMERA MOUNTING OR DOLLY

Otto Halmer, Los Angeles, Calif.

Application December 7, 1945, Serial No. 633,301

11 Claims. (Cl. 248—177)

This invention relates to a mounting or dolly for supporting a camera on a tripod or other support.

The invention concerns a type of construction which is capable of holding or supporting the camera disposed at practically any compound angle with respect to a vertical axis, or substantially upright axis, on which the base of the mounting or dolly is secured to the tripod head. One of the objects of this invention is to enable this to be accomplished by means of a simple construction for the dolly.

Another object of the invention is to provide a mounting of this type for a camera, constructed in such a way that it will permit a considerable amount of movement of the camera about a horizontal axis, the general purpose being to enable the camera to be swung in a vertical plane through a considerable angle approximating or exceeding 180 degrees.

This device is intended to be of substantial construction to enable it to support a camera of considerable weight, and one of the objects of the invention is to provide means for insuring that the camera can be firmly held in any position in which the dolly is adjusted in setting up the camera for a "shot."

Another object of the invention is to provide a construction of this type in which the dolly will present two axes of rotation disposed substantially at right angles to each other and located in the same plane or substantially so; also to provide brake means associated with the adjusting means for each axis, which will operate to present a large frictional area, which can be clamped up so as to develop great resistance to any undesired movement after the dolly has been clamped up in the required position.

Further objects of the invention will appear hereinafter.

The invention consists in the novel parts and combinations of parts to be described hereinafter, all of which contribute to produce an efficient camera mounting or dolly.

A preferred embodiment of the invention is described in the following specification, while the broad scope of the invention is pointed out in the appended claims.

In the drawing:

Fig. 1 is a view showing the lower portion of the base member in elevation, and showing its upper portion in section, taken about on the main horizontal axis of rotation. In this view certain parts are broken away and shown in elevation, and also in this view, the upper member of the dolly is indicated in dotted lines in an inclined position to illustrate how this member of the dolly can be rotated about a secondary horizontal axis. The section of this view is taken on the line 1—1 of Fig. 2, but shows the upper member of the dolly down in a substantially horizontal position instead of raised at an angle as it is shown in Fig. 2.

Fig. 2 is a vertical section taken about on the line 2—2 of Fig. 1 through the base member of the dolly, and showing the parts of the upper member of the dolly partially in section and partially in elevation. This view also shows the upper dolly member in a raised or inclined position at a small angle, and in this view a portion of a handle or knob is shown broken away.

Fig. 3 is a view somewhat similar to Fig. 2, but showing a portion of the lower dolly member in elevation instead of in section as in Fig. 2; and this view also shows the upper dolly member in elevation instead of in section.

Fig. 4 is a section taken on the line 4—4 of Fig. 2, passing through the auxiliary mandrel, and particularly illustrating the brake that is employed for enabling the upper dolly member to be clamped in any adjusted position about the axis of the auxiliary mandrel.

Fig. 5 is a section taken about on the line 5—5 of Fig. 2, but with the upper member of the dolly in horizontal position instead of the inclined position shown in Fig. 2. This view shows the main mandrel and the auxiliary mandrel in plan view with the supporting lugs or ears of the upper dolly member in section.

Broadly, my invention includes the provision of means for supporting the upper member of the dolly on the lower member, so that it is rotatable on a substantially horizontal axis located in a lateral position with respect to the geometrical middle portion of the lower dolly member; and providing means for supporting the upper dolly member also for rotation on a second axis extending substantially at right angles to the first-named axis, and also substantially in the same plane with it; and associated with each of the means for maintaining these separate axes of rotation, I provide means for holding the upper dolly member against rotation about either of these axes.

Referring more particularly to the parts, in practicing the invention I provide a lower dolly member 1 which preferably includes a base platen or base plate 2 which is constructed so that it can support an upper dolly member 3 for rotation on a horizontal axis, and this axis is located in a main arbor that is mounted for rotation in two supporting lugs 5 that extend upwardly from the base 2, and which may be formed integral therewith as shown. These two lugs 5 are located considerably removed from the geometrical middle portion of the base platen or plate 2 (see Fig. 5), which shows that these lugs are located, in the present instance, toward one edge of the base platen, the body portion of which is of substantially circular form.

In the normal position of the dolly, when the face plate 6 of the upper dolly member 3 is in a substantially horizontal position, the auxiliary arbor 7 that carries the lugs or ears 5, is disposed in a substantially horizontal position, However, this arbor 7 may be swung up to an inclined position as indicated in Fig. 2, and the main arbor 4 is provided with means for enabling the auxiliary arbor to be held in any angular adjusted position. Any suitable means may be used to this end, but I prefer to employ brake means 8 for that purpose, (see Figs. 2 and 5). This auxiliary arbor 7 includes a head or bolster 9a of semi-cylindrical form with a flat end face 9c and having a substantially flat-sided body portion 9b. From the inner end of the head 9 a shank 10 of reduced diameter extends across the dolly, located on a diameter of the lower plate or base 2, and its outer end assists in supporting the upper dolly member, as will be described hereinafter.

Referring again to the brake means 8, the main arbor 4 is provided with an inner shaft 11, one end of which is rotatably mounted in one of the lugs 5, as illustrated at the right in Fig. 1, and the other end of which is rotatably mounted in the other lug. Beyond this point, this shaft 11 is provided with a threaded end 12 which is threaded into the shank 13 of a knob or handle 14 for clamping up the brake means 8. In order to accomplish this, the end of the shaft 11 remote from the knob 14, is provided with a sleeve 15 which is rigidly secured to it by any means, such as a cross pin 16, as shown. A similar sleeve 17 is provided toward the other end of the inner shaft 11, but this sleeve may be loosely mounted on the shaft. Both of these sleeves have enlarged heads 18 at their inner ends, that press up against a bank or pack of friction plates 19, and these friction plates include two sets, one set 19a with substantially circular bodies 20 with openings mounted on the inner shaft 11, and the bodies of these plates extend longitudinally with the auxiliary arbor 7 alongside of its head 9b as shown in Fig. 5, their inner ends being secured to the inner end of this part 9b by a transverse bolt or pin 21. These friction plates 19a receive between them another pack 19b of friction plates that have openings at one end received on the inner shaft 11, and these friction plates 19b extend downwardly in an inclined direction as indicated in Fig. 2, and are anchored at the ends of a lug 22 that extends up from the base member 2, being secured to the ends of this lug by a through pin or bolt 23.

Referring again to Fig. 1, the left end of the sleeve 17 abuts up against a collar or washer 24 that seats against the inner face of the adjacent lug 5. With this construction just described, it will be evident that if the knob 14 is rotated in a clockwise direction on the thread 12 (which is a right-hand thread), the sleeve 15 will be pulled up against the bank of friction plates 19 that are located at the right side of the center line of the structure as viewed in Fig. 1, and they will exert pressure against the adjacent side of the head 9 and press the other side of the head against the bank of friction plates 19 at its other side. This will press these plates up against the head 18 on the sleeve 17, which in turn will exert pressure against the collar 24, which will be imparted to the lug 5 which is adjacent. Any number of friction plates can be employed. In the present instance, however, I have illustrated four of the plates 19b, the three spaces between these plates being occupied by the other plates 19a.

Referring again to Fig. 2, the face plate 6 of the upper dolly member 3 has downwardly projecting lugs 25 and 26, which are located on a transverse medial axis of the face plate, and the lug 25 is mounted on the flat face 9c of the head 9a by means of a gudgeon or pintle 27 formed as a reduced tip on a screw 28 that is threaded into the lug.

At the outer end of the shank 10 of this auxiliary arbor 9, I provide brake means 30 that includes two sets of friction plates 31. One of these sets is indicated by the reference numeral 31a. These friction plates have central openings enabling them to be received over a shank 32 that extends in from the shaft 33 of a clamping knob or handle 34. Toward their lower end these plates 31a have openings or eyes, respectively, that are received over a pintle 35 that is a press fit in the lower portion of a head 36 that is formed integrally on the shank 10.

The other friction plates 31b are mounted on the shank 32 like the plates 31a, but they extend upwardly and have eyes or openings that fit over a pintle 37 similar to the pintle 35, but which is a press fit in the lug 26. The friction plates 31b, of course, occupy the spaces between the friction plates 31a. The ends of the pintles 35 and 37 project beyond the banks of plates, and each pintle is provided with a head or collar 38 that is rigid with it or pinned to it to hold the adjacent plates in position. As indicated in Fig. 4, the material in the head 36 is formed with an arc-shaped clearance slot 39 to clear the adjacent pintle head 38, and a similar clearance slot 40 is formed on the inner face of the adjacent lug 26, to permit free movement of the collar or head 38 on the projecting end of the pintle 35. This clearance slot 40 is indicated in dotted lines in Fig. 4, because it is hidden from view by the head 36.

The shaft 33 of the knob 34 is of larger diameter than its shank or reduced neck 32, so that a shoulder is formed that seats against a washer 41. The inner end of the shank 32 has a threaded tip 42 that is received in a correspondingly threaded socket 43 in the end of the shank 10, and beyond the bore 44 in the end of this shank that receives and guides the shank 32. With this construction it will be evident that if the knob 34 is rotated in a clockwise direction, the right-hand thread on the threaded tip 42 will pull the head 36 up against the bank of friction plates adjacent to it, and clamp them against the inner face of the lug 26. In this way, a considerable resistance will be offered to any force tending to rotate the upper dolly member 3 on the axis of the secondary arbor 7.

In order to enable the dolly to be mounted on the camera tripod, the geometrical center of the base of platen 2 is provided with a threaded socket to receive the screw that projects up from the head of the tripod. In the present instance, a bushing 45 is provided for this purpose. (See Fig. 2.)

In order to secure the camera bottom on the face plate 6, the under side of the face plate is provided with a screw 46 the threaded tip of which projects upwardly beyond the upper face of the face plate. This screw is held yieldingly with its threaded tip projecting above the upper face of the face plate, by means of a coil spring 47 mounted in an annular housing 48 secured at its inner end 49 to the under side of the plate. The lower end of this spring thrusts against a cap disc 50 that may be riveted or secured by small screws 51, to the lower end of the housing, and below the cap disc 50 the screw 46 is provided with a rigid head 52 to enable it to be rotated at will. The upper end of the spring 47 thrusts against a collar 53 that seats against the bottom of a countersink or counterbore 54 in the lower side of the plate 6, that is of substantially the same diameter as the bore in the housing 48. This collar 53 is tight on the thread of the threaded tip of the screw, that is to say, when these parts are assembled, the collar 53 is put in place, and the screw is screwed into it from below, and finally becomes tight on the screw at the inner end of its threaded tip. This mounting for the screw 46 is not part of my invention, but is merely illustrated as a means for securing the bottom of the camera to the face plate 6 of the dolly.

In Fig. 3, I illustrate an extreme position to which the upper member of the dolly can be swung, and in reading this view, it should be understood that the bottom of the camera is against the left-hand face of the face plate 6. As the principal axis of the lens assembly in the camera is substantially parallel with the bottom of the camera, it will be evident that a position such as this for the upper dolly member, enables the camera to be directed down from an elevation onto a scene below it that is to be "shot."

It is evident that by reason of the presence of the two axes of rotation in this dolly, disposed at right angles to each other, the camera can be moved so as to occupy any compound angle with respect to the substantially horizontal tripod head; and, furthermore, by reason of the brake means on the main arbor and the auxiliary arbor, the camera can be securely held in any position into which the dolly is adjusted to suit the requirements of the exposure that is to be made for the camera.

The advantage of anchoring the plates 19b on the lug 22, is evident from an inspection of Fig. 2. By reason of the fact that this lug is considerably removed toward the middle of the plate 2, there is a considerable clearance space below the cylindrical portion 9a of the head 9 and above the plate, into which the lower end of the adjacent lug 25 can project when the upper dolly member 3 is swung up into an elevated position and through a great angle, which could be more than a right angle as indicated in Fig. 4.

Many other embodiments of the invention may be resorted to without departing from the spirit of the invention.

I claim as my invention:

1. In a camera mounting or dolly for supporting a camera on a tripod or the like, the combination of a base to be attached to the tripod head, an upper dolly member having a substantially flat upper face constituting a camera seat, a fastening bolt on said seat for securing the camera thereto, and about which the camera can be adjustably oriented, means for supporting the upper dolly member on the base for adjusting rotation about a first axis located in a laterally displaced position with respect to the middle portion of the base member, said supporting means including means for enabling the upper dolly member to be rotated for adjustment around a second axis disposed substantially in a plane passing through the first axis and extending substantially at right angles to the first named axis.

2. A camera mounting or dolly according to claim 1, including means for holding the upper dolly member in different adjusted positions with reference to said axes.

3. In a camera mounting for supporting a camera on a tripod or the like, the combination of a base platen having means for securing the same to a support, bearing-means located in a lateral position with respect to the geometrical middle portion of said platen, an arbor rotatably supported in said bearing-means above the level of the platen, a second arbor having its own axis of rotation distinct from said first axis, movably supported for rotation about the axis of said first-named arbor, and located with its axis substantially in line with, and extending transversely to, the axis of the first-named arbor, means for holding said second arbor in different adjusted positions with respect to the axis of the first-named arbor, a face plate mounted to swing for adjustment on the longitudinal axis of said second-named arbor, having a substantially flat upper face constituting a camera seat, a fastening bolt on said seat for securing the camera thereto, and about which the camera can be adjustably oriented and means for holding the face plate in different adjusted positions about the axis of the second-named arbor.

4. In a camera mounting for support on a tripod or the like, the combination of a base platen having means for securing the same to a support, bearing means located toward the edge of the platen, an arbor rotatably supported in said bearing means above the level of the face of the platen, a second arbor having its own axis of rotation distinct from said first axis, movably supported for rotation about the axis of said first-named arbor and located with its axis substantially in line with, and extending transversely to, the axis of the first-named arbor, means for clamping said second arbor in different adjusted positions with respect to the axis of the first-named arbor, a face plate mounted to swing for adjustment on the longitudinal axis of said second-named arbor, having a substantially flat upper face constituting a camera seat, a fastening bolt on said seat for securing the camera thereto, and about which the camera can be adjustably oriented and means for clamping the face plate in different adjusted positions about the axis of the second-named arbor.

5. A camera mounting or dolly according to claim 1, in which the upper dolly member includes a face plate to operate as a seat for the camera, and in which the means for supporting the upper dolly member establishes the first axis at an elevation above the said base all of said parts cooperating to enable the face-plate to be swung about the first named axis through more than a right angle; brake means associated with said first axis including a set of brake plates connected with the upper dolly member to swing upwardly and downwardly with the same about said first axis, and including a set of brake plates operatively connected with the face plate, to resist rotation thereof when the upper dolly member is swung on said first axis.

6. A camera mounting or dolly according to claim 2, in which the upper dolly member includes a face plate to operate as a seat for the camera, and in which the means for supporting the upper dolly member establishes the first axis at an elevation above the said base; brake means associated with said first axis including a set of brake plates connected with the upper dolly member to swing upwardly and downwardly with the same about said first axis, and including a set of brake plates operatively connected with the face plate, to resist rotation thereof when the upper dolly member is swung on said first axis; and including brake means associated with the second axis of rotation.

7. A camera mounting or dolly according to claim 1, in which the upper dolly member includes a face plate to operate as a seat for the camera, and in which the means for supporting the upper dolly member establishes the first axis at an elevation above the said base; brake means associated with said first axis including a set of brake plates connected with the upper dolly member to swing upwardly and downwardly with the same about said first axis, and including a set of brake plates operatively connected with the face plate, to resist rotation thereof when the upper dolly member is swung on said first axis, and manually operated means mounted on the first axis, with means associated therewith for exerting pressure on the sets of brake plates to resist movement of the upper dolly member about said first axis.

8. A camera mounting or dolly according to claim 1, in which the upper dolly member includes a face plate to operate as a seat for the camera, and in which the means for supporting the upper dolly member establishes the first axis at an elevation above the said base; brake means associated with said first axis including a set of brake plates connected with the upper dolly member to swing upwardly and downwardly with the same about said first axis, and including a set of brake plates operatively connected with the face plate, to resist rotation thereof when the upper dolly member is swung on said first axis, and manually operated means mounted on the first axis, with means associated therewith for exerting pressure on the sets of brake plates to resist movement of the upper dolly member about said first axis, and including brake means associated with said second axis of rotation, having friction plates with manually operated means located on said second axis for exerting pressure upon the last-named friction plates to maintain the upper dolly member in a fixed position with reference to the said second axis.

9. A camera mounting or dolly according to claim 1, including an arbor extending longitudinally with one of said axes of rotation, said arbor having a friction brake with brake plates disposed substantially at right angles to the axis of rotation for said arbor, and manually operated means on the said axis of rotation for the arbor, capable of clamping the friction plates together to resist movement of the upper dolly member after adjustment thereof.

10. In a camera mounting or dolly for supporting a camera on a tripod or the like, the combination of a base having means located substantially at the geometrical middle portion thereof for attaching the same to a tripod head, lugs disposed laterally on said base with respect to the said middle portion thereof, an arbor supported at one end for rotation on an axis extending between said lugs, and capable of extending in a substantially horizontal position across and above said base, an upper dolly member having a face plate operating as a seat for supporting the camera and having a pair of downwardly projecting lugs pivotally mounted on the ends of said arbor, said last-named pivotal mounting and the pivotal support for said arbor enabling said upper dolly member to be rotated for adjustment about two pivotal axes, means associated with said first-named lugs for securing the said arbor in different adjusted positions with respect to its axis of rotation on the first-named lugs, and means for securing the upper dolly member in different adjusted positions on its axis of rotation on said arbor.

11. In a camera mounting or dolly for supporting a camera on a tripod or the like, the combination of a base having means located substantially at the geometrical middle portion thereof for attaching the same to a tripod head, lugs disposed laterally on said base with respect to the said middle portion thereof, a main arbor carried for rotation on an axis between said lugs, means associated with said main arbor and said lugs for securing the arbor in different adjusted positions with respect to its axis of support in said lugs, a second arbor supported at one end on said first-named arbor and capable of extending in a substantially horizontal position across and above said base, an upper dolly member having a face plate operating as a seat for supporting the camera, and having a pair of downwardly projecting lugs pivotally mounted on the said second arbor, said last-named pivotal mounting and the pivotal support for said second arbor enabling said upper dolly member to be rotated for adjustment about both of said pivotal axes; and means associated with the second arbor for securing the upper dolly member in different adjusted positions on its axis of rotation on said second arbor.

OTTO HALMER.

REFERENCES CITED

The following references are of record in the file of this patent:

UNITED STATES PATENTS

| Number | Name | Date |
|---|---|---|
| 1,844,113 | Beidler | Feb. 9, 1932 |
| 2,054,614 | Copony | Sept. 15, 1936 |
| 2,383,170 | Stoll | Aug. 21, 1945 |